United States Patent

Rosinski et al.

[11] Patent Number: 5,334,367
[45] Date of Patent: Aug. 2, 1994

[54] ZEOLITE ZSM-45

[75] Inventors: Edward J. Rosinski, Pedricktown, N.J.; Mae K. Rubin, Bala Cynwyd, Pa.

[73] Assignee: Mobil Oil Corp., Fairfax, Va.

[21] Appl. No.: 964,477

[22] Filed: Oct. 21, 1992

Related U.S. Application Data

[63] Continuation of Ser. No. 511,895, Apr. 10, 1990, abandoned, which is a continuation of Ser. No. 562,359, Dec. 16, 1983, abandoned, which is a continuation-in-part of Ser. No. 425,019, Sep. 27, 1982, abandoned.

[51] Int. Cl.$^5$ .................... C01B 33/26; B01J 29/06
[52] U.S. Cl. .................. 423/704; 423/328.2; 423/329.1; 502/71; 502/77
[58] Field of Search ................ 502/64, 71, 77; 423/328.21, 329.11, 704

[56] References Cited

U.S. PATENT DOCUMENTS

| | | | |
|---|---|---|---|
| 3,962,364 | 6/1976 | Young | 502/64 |
| 4,086,186 | 4/1978 | Rubin et al. | 423/329 T |
| 4,372,930 | 2/1983 | Short et al. | 423/328 |
| 4,440,871 | 4/1984 | Lok et al. | 502/214 |

FOREIGN PATENT DOCUMENTS 0091048 10/1983 European Pat. Off. ............ 423/328

OTHER PUBLICATIONS

Lok, B. M. et al., "The role of organic molecules in molecular sieve synthesis", Zeolites, vol. 3, 282-291 (1983).

Primary Examiner—Anthony McFarlane
Attorney, Agent, or Firm—Alexander J. McKillop; Dennis P. Santini; Edward F. Kenehan, Jr.

[57] ABSTRACT

This invention relates to a new synthetic porous zeolite, characterize as ZSM-45, a method for its preparation and use thereof in catalytic conversion of organic compounds. This crystalline material may have a ratio of $XO_2:Y_2O_3$ of at least 8, wherein X represents silicon and/or germanium and Y represents aluminum, boron, chromium, iron and/or gallium. When X is silicon and Y is aluminum, the new, synthetic zeolite is analogous, in some respects, to the naturally occuring zeolite, levynite. The silica/alumina form of this new crystalline material has a silica to alumina ratio of at least 8 and may be prepared with directing agents which are 2-(hydroxyalkyl) trialkylammonium compounds, dimethyldiethylammonium compounds or cobalticinium compounds. The new crystalline material exhibits a characteristic X-ray diffraction pattern.

1 Claim, No Drawings

ZEOLITE ZSM-45

CROSS-REFERENCE TO RELATED APPLICATIONS

This application is a continuation of U.S. application Ser. No. 07/511,895, filed Apr. 10, 1990, now abandoned, which is a continuation of U.S. application Ser. No. 06/562,359, filed Dec. 16, 1983, now abandoned, which is a continuation-in-part of U.S. application Ser. No. 06/425,019, filed Sep. 27, 1982, now abandoned, the entire disclosure of which is expressly incorporated herein by reference.

BACKGROUND

This invention relates to a catalyst comprising a novel synthetic porous zeolite, characterized as zeolite ZSM-45, to a method for its preparation and to its use in catalytic conversion of organic compounds.

Zeolitic materials, both natural and synthetic, have been demonstrated in the past to have catalytic properties for various types of hydrocarbon conversion. Certain zeolitic materials are ordered, porous crystalline aluminosilicates having a definite crystalline structure as determined by X-ray diffraction, within which there are a large number of smaller cavities which may be interconnected by a number of still smaller channels or pores. These cavities and pores are uniform in size within a specific zeolitic material. Since the dimensions of these pores are such as to accept for adsorption molecules of certain dimensions while rejecting those of larger dimensions, these materials have come to be known as "molecular sieves" and are utilized in a variety of ways to take advantage of these properties.

Such molecular sieves, both natural and synthetic, include a wide variety of positive ion-containing crystalline aluminosilicates. These aluminosilicates can be described as a rigid three-dimensional framework of $SiO_4$ and $AlO_4$ in which the tetrahedra are cross-linked by the sharing of oxygen atoms whereby the ratio of the total aluminum and silicon atoms to oxygen atoms is 1:2. The electrovalence of the tetrahedra containing aluminum is balanced by the inclusion in the crystal of a cation, for example an alkali metal or an alkaline earth metal cation. This can be expressed wherein the ratio of aluminum to the number of various cations, such as $Ca/2$, $Sr/2$, Na, K or Li, is equal to unity. One type of cation may be exchanged either entirely or partially with another type of cation utilizing ion exchange techniques in a conventional manner. By means of such cation exchange, it has been possible to vary the properties of a given aluminosilicate by suitable selection of the cation. The spaces between the tetrahedra are occupied by molecules of water prior to dehydration.

Prior art techniques have resulted in the formation of a great variety of synthetic zeolites. The zeolites have come to be designated by letter or other convenient symbols, as illustrated by zeolite A (U.S. Pat. No. 2,882,243), zeolite X (U.S. Pat. No. 2,882,244), zeolite Y (U.S. Pat. No. 3,130,007), zeolite ZK-5 (U.S. Pat. No. 3,247,195), zeolite ZK-4 (U.S. Pat. No. 3,314,752), zeolite ZSM-5 (U.S. Pat. No. 3,702,886), zeolite ZSM-11 (U.S. Pat. No. 3,709,979), zeolite ZSM-12 (U.S. Pat. No. 3,832,449), zeolite ZSM-20 U.S. Pat. No. 3,972,983), ZSM-35 (U.S. Pat. No. 4,016,245), ZSM-38 (U.S. Pat. No. 4,046,859), and zeolite ZSM-23 (U.S. Pat. No. 4,076,842), merely to name a few.

The $SiO_2/Al_2O_3$ mole ratio of a given zeolite is often variable. For example, zeolite X can be synthesized with $SiO_2/Al_2O_3$ ratios of from 2 to 3; zeolite Y, from 3 to about 6. In some zeolites, the upper limit of the $SiO_2/Al_2O_3$ ratio is unbounded ZSM-5 is one such example wherein the $SiO_2/Al_2O_3$ ratio is at least 5 and up to infinity. U.S. Pat. No. 3,941,871 (Re. 29,948) discloses a porous crystalline silicate made from a reaction mixture containing no deliberately added alumina in the recipe and exhibiting the X-ray diffraction pattern characteristic of ZSM-5 type zeolites. U.S. Pat. Nos. 4,061,724, 4,073,865 and 4,104,294 describe crystalline silicates or organosilicates of varying alumina and metal content.

A number of synthetic zeolites have been prepared which may be said to be isostructural with naturally occurring zeolites. Zeolites ZSM-35 and ZSM-38 are, for instance, ferrierite-type zeolites. Zeolite ZK-20 (U.S. Pat. No. 3,459,676) is described as being isostructural with the naturally occurring zeolite levynite. European Patent Application 40,016 and U.S. Pat. Nos. 4,361,715 and 4,372,930 describe synthetic zeolite Nu-3 which is levynite-type.

Although zeolites were originally most commonly defined as materials containing silica and alumina, it is recognized that the silica and alumina portions may be replaced in whole or in part with other oxides. More particularly, $GeO_2$ is an art recognized substitute for $SiO_2$ and $B_2O_3$, $Cr_2O_3$, $Fe_2O_3$, and $Ga_2O_3$ are art recognized replacements for $Al_2O_3$. Accordingly, the term zeolite as used herein shall connote not only materials containing silicon and, optionally, aluminum atoms in the crystalline lattice structure thereof, but also materials which contain suitable replacement atoms for such silicon and/or aluminum. On the other hand, the term aluminosilicate zeolite as used herein shall define zeolite materials consisting essentially of silicon and, optionally, aluminum atoms in the crystalline lattice structure thereof, as opposed to materials which contain substantial amounts of suitable replacement atoms for such silicon and/or aluminum.

The entire disclosures of the above-mentioned U.S. patents are also expressly incorporated herein by reference.

SUMMARY

The present invention is directed to a novel synthetic porous zeolite, characterize as ZSM-45, a method for its preparation and the conversion of organic compounds contacted therewith. The aluminosilicate form of zeolite ZSM-45 may be described as a high silica form of a levynite family of materials which exhibits a composition and properties which distinguish it from natural levynite. Zeolite ZSM-45 also exhibits a characteristic X-ray powder diffraction pattern which distinguishes it from other known synthetic and naturally occurring zeolites. It may be said to be levynite-type, however.

The porous crystalline zeolite ZSM-45, especially as calcined, is characterized by a distinctive X-ray diffraction pattern substantially as shown in Table 1 hereinafter. Zeolite ZSM-45 generally has a ratio of $XO_2:Y_2O_3$ of at least 8, wherein X represents silicon and/or germanium and Y represents aluminum, boron, chromium, iron and/or gallium. Preferably, there are from greater than 8 to about 100 moles of $XO_2$ per mole of $Y_2O_3$. Preferably, $XO_2$ is silica and $Y_2O_3$ is alumina.

Zeolite ZSM-45 may have a composition, on an anhydrous basis and in terms of moles of oxides per mole of $Y_2O_3$, expressed by the formula:

$$(1-2.6)M_{2/m}O:Y_2O_3:xXO_2 \quad (I)$$

wherein N represents one or more cations having valence m and x is at least 8. In the above formula (I), M can be a hydrogen cation, provided that said hydrogen cation is bound to an anionic site on tetrahedra of said zeolite containing Y atoms. Of course, if M represented hydrogen not bound to said anionic sites, $M_{2/m}O$ would represent $H_2O$ which is impossible, because formula I is expressed on an anhydrous basis.

The as synthesized form of ZSM-45 may have a composition, on an anhydrous basis and in terms of moles of oxides per mole of alumina, expressed by the formula:

$$(0.5-1.8)R_2O:(0.0-0.3)Na_2O:(0.0-0.5)K_2O:Y_2O_3:xXO_2$$

wherein $R_2O$ is the oxide form of a suitable directing agent and x is as defined hereinbefore. Especially when R is 2-(hydroxyalkyl) trialkylammonium, the as synthesized form of ZSM-45 may, preferably, have at least 0.8 moles of $R_2O$ per mole of $Y_2O_3$.

The term directing agent, as used herein, shall connote organic or organometallic compounds which are added to the crystallization mixture used to form a zeolite in order to influence the morphology of the ultimately formed crystal lattice. At least a portion of the cations corresponding to the directing agent are bound to anionic sites of the crystal lattice in the as synthesized form of the zeolite. Directing agents which have been verified as capable of influencing the formation of ZSM-45, provided that other ZSM-45 formation conditions are met, include 2-(hydroxyalkyl)trialkylammonium compounds, dimethyldiethylammonium compounds and cobalticinium compounds.

DESCRIPTION OF SPECIFIC EMBODIMENTS

The original alkali metal cations of the as synthesized ZSM-45 can be replaced in accordance with techniques well known in the art, at least in part, by ion exchange with other cations. Preferred replacing cations include metal ions, hydrogen ions, hydrogen precursor, e.g. ammonium, ions and mixtures thereof. Particularly preferred cations are those which render the ZSM-45 catalytically active, especially for hydrocarbon conversion. Replacing cations include hydrogen, rare earth metals and metals of Groups IA, IIA, IIIA, IVA, IB, IIB, IIIB, IVB and VIII of the Periodic Table of the Elements.

A typical ion exchange technique would be to contact the synthetic ZSM-45 with a salt of the desired replacing cation or cations. Examples of such salts include the halides, e.g. chlorides, nitrates and sulfates.

Catalytically active zeolite ZSM-45 described and claimed herein has a definite X-ray diffraction pattern which distinguishes it from other crystalline materials. The X-ray diffraction pattern of zeolite ZSM-45, especially as calcined, has the following characteristic lines:

TABLE 1

| Interplanar D-Spacing (A) | Relative Intensity, I/Io |
|---|---|
| 11.34 ± 0.20 | Weak |
| 10.16 ± 0.18 | Weak |
| 8.02 ± 0.14 | Strong-Very Strong |
| 7.56 ± 0.14 | Weak |
| 6.55 ± 0.12 | Medium-Very Strong |
| 5.66 ± 0.10 | Weak |
| 5.50 ± 0.10 | Weak |

TABLE 1-continued

| Interplanar D-Spacing (A) | Relative Intensity, I/Io |
|---|---|
| 5.07 ± 0.09 | Medium-Strong |
| 4.95 ± 0.09 | Weak |
| 4.21 ± 0.08 | Medium-Strong |
| 4.01 ± 0.07 | Strong-Very Strong |
| 3.78 ± 0.07 | Medium-Strong |
| 3.60 ± 0.06 | Weak |
| 3.54 ± 0.06 | Weak-Medium |
| 3.42 ± 0.06 | Weak |
| 3.27 ± 0.06 | Medium |
| 3.11 ± 0.06 | Medium-Strong |
| 3.03 ± 0.05 | Weak |
| 2.812 ± 0.05 | Weak |
| 2.751 ± 0.05 | Medium-Strong |
| 2.583 ± 0.05 | Weak |
| 2.535 ± 0.05 | Weak |
| 2.521 ± 0.05 | Weak |
| 2.475 ± 0.04 | Weak |
| 2.405 ± 0.04 | Weak |
| 2.362 ± 0.04 | Weak |
| 2.251 ± 0.04 | Weak |
| 2.181 ± 0.04 | Weak |
| 2.133 ± 0.04 | Weak |
| 2.097 ± 0.04 | Weak |
| 2.029 ± 0.04 | Weak |
| 2.006 ± 0.03 | Weak |
| 1.889 ± 0.03 | Weak |
| 1.859 ± 0.03 | Weak |
| 1.843 ± 0.03 | Weak |
| 1.815 ± 0.03 | Weak |
| 1.765 ± 0.03 | Weak |
| 1.721 ± 0.03 | Weak |
| 1.710 ± 0.03 | Weak |
| 1.650 ± 0.03 | Weak |
| 1.637 ± 0.03 | Weak |
| 1.617 ± 0.03 | Weak |
| 1.606 ± 0.03 | Weak |
| 1.559 ± 0.03 | Weak |

These values were determined by standard techniques. The radiation was the K-alpha doublet of copper and a diffractometer equipped with a scintillation counter and an associated computer was used. The peak heights, I, and the positions as a function of 2 theta, where theta is the Bragg angle, were determined using algorithms on the computer associated with the spectrometer. From these, the relative intensities, 100 $I/I_o$, where $I_o$ is the intensity of the strongest line or peak, and d (obs.) the interplanar spacing in Angstrom units (A), corresponding to the recorded lines, were determined. In Table 1, the relative intensities are given in terms of the strongest line being taken as 100.0. It should be understood that this X-ray diffraction pattern is characteristic of all the species of zeolite ZSM-45 compositions. The sodium form as well as other cationic forms reveal substantially the same pattern with some minor shifts in interplanar spacing and variation in relative intensity. Other minor variations can occur, depending on the silicon to aluminum ratio of the particular sample, as well as its degree of thermal treatment.

The new zeolite ZSM-45 sorbs significant amounts of commonly used test adsorbate materials, i.e. cyclohexane, n-hexane and water, whereas naturally occurring levynite is not expected to adsorb cyclohexane due to its pore structure. Sorption capacities for zeolite ZSM-45 may range at room temperature as follows:

| Adsorbate | Capacity, Wt. Percent |
|---|---|
| Cyclohexane | 2-5 |
| n-Hexane | 7-15 |

| Adsorbate | Capacity, Wt. Percent |
|---|---|
| Water | 14–25 | wherein cyclohexane and n-hexane sorption are measured at 20 Torr and water sorption is measured at 12 Torr.

The zeolite of the present invention can be used either in the alkali metal form, e.g. the sodium or potassium form; the ammonium form; the hydrogen form or another univalent or multivalent cationic form. When used as a catalyst the zeolite will be subjected to thermal treatment to remove part or all of the organic constituent.

The zeolite can also be used as a catalyst in intimate combination with a hydrogenating component such as tungsten, vanadium, molybdenum, rhenium, nickel, cobalt, chromium, manganese, or a noble metal such as platinum or palladium where a hydrogenation-dehydrogenation function is to be performed. Such component can be exchanged into the composition to the extent atom Y, e.g., aluminum, is in the structure, impregnated therein or intimately physically admixed therewith. Such component can be impregnated in or on to it such as for example, by, in the case of platinum, treating the zeolite with a solution containing a platinum metal-containing ion. Thus, suitable platinum compounds include chloroplatinic acid, platinous chloride and various compounds containing the platinum amine complex.

Zeolite ZSM-45, especially in its metal, hydrogen and ammonium forms can be beneficially converted to another form by thermal treatment. This thermal treatment is generally performed by heating one of these forms at a temperature of at least 370° C. for at least 1 minute and generally not longer than 20 hours. While subatmospheric pressure can be employed for the thermal treatment, atmospheric pressure is desired for reasons of convenience. The thermal treatment can be performed at a temperature up to about 925° C. The thermally treated product is particularly useful in the catalysis of certain hydrocarbon conversion reactions.

The new zeolite, when employed either as an adsorbent or as a catalyst in an organic compound conversion process should be dehydrated, at least partially. This can be done by heating to a temperature in the range of 200° C. to 595° C. in an inert atmosphere, such as air, nitrogen, etc. and at atmospheric, subatmospheric or superatmospheric pressures for between 30 minutes and 48 hours. Dehydration can also be performed at room temperature merely by placing ZSM-45 in a vacuum, but a longer time is require to obtain a sufficient amount of dehydration.

The new zeolite can be prepared from a reaction mixture containing sources of alkali metal ions (Z), an oxide of Y, an oxide of X, an organic or organometallic cation (R), and water. When R is derived from a 2-(hydroxyalkyl)trialkylammonium compound wherein alkyl is composed of one or two carbon atoms, the reaction mixture may comprise an appropriate ZSM-45 formation selection of reactants, having a composition, in terms of mole ratios of oxides, falling within the following ranges:

| Reactants | Useful | Preferred |
|---|---|---|
| $SiO_2/Al_2O_3$ | 10–150 | 15–80 |
| $OH^-/SiO_2$ | 0.3–1.0 | 0.3–0.8 |
| $H_2O/OH^-$ | 20–100 | 20–80 |
| R/(R + Z) | 0.1–0.8 | 0.2–0.7 |
| K/(K + Na) | 0.0–0.8 | 0.05–0.3 | wherein R and Z are as above defined.

When R is a dimethyldiethylammonium (DMDEA) compound, the reaction mixture may, optionally, be essentially free of potassium ions and may comprise an appropriate ZSM-45 formation selection of reactants, in terms of mole ratios of oxides, falling within the following ranges:

| Reactants | Useful | Preferred |
|---|---|---|
| $SiO_2/Al_2O_3$ | 10–80 | 20–60 |
| $H_2O/OH^-$ | 15–100 | 20–80 |
| $OH^-/SiO_2$ | 0.40–0.80 | 0.50–0.70 |
| DMDEA/(DMDEA + Z) | 0.75–1.0 | 0.8–0.95 | wherein Z and DMDEA are as above defined.

When R is a cobalticinium compound, the reaction mixture may comprise an appropriate ZSM-45 formation selection of reactants, in terms of mole ratios of oxides, falling within the following ranges:

| Reactants | Useful | Preferred |
|---|---|---|
| $SiO_2/Al_2O_3$ | 10–30 | 10–15 |
| $OH^-/SiO_2$ | 0.005–1.0 | 0.2–0.6 |
| $Z/SiO_2$ | 0.001–5.0 | 0.1–1.5 |
| $H_2O/SiO_2$ | 10–200 | 20–100 |
| $R/SiO_2$ | 0.01–3 | 0.05–1.5 | wherein R and Z are as above defined.

Crystallization of the new zeolite ZSM-45 can be carried out at either static or stirred conditions in a suitable reactor vessel, such as for example, polypropylene jars or teflon lined or stainless steel autoclaves. A useful range of temperatures for crystallization is from about 80° C. to about 350° C. for a time of about 12 hours to about 200 days. Thereafter, the crystals are separated from the liquid and recovered. The composition can be prepared utilizing materials which supply the appropriate oxides. Such compositions may include sodium silicate, silica hydrosol, silica gel, silicic acid, sodium hydroxide, a source of aluminum, and an appropriate organic compound. It should be realized that the reaction mixture component oxides can be supplied from more than one source. The reaction mixture can be prepared either batchwise or continuously. Crystal size and crystallization time of the new crystalline zeolite ZSM-45 will vary with the nature of the reaction mixture employed and the crystallization conditions.

In all cases, synthesis of the ZSM-45 crystals is facilitated by the presence of at least 0.01 percent, preferably 0.10 percent and still more preferably 1 percent, seed crystals (based on total weight) of crystalline product.

It will be readily understood by those of ordinary skill in the art that the above recitation of useful and preferred ranges of reactants does not constitute a warranty that all possible combinations of reactants falling within these ranges will automatically lead to the production of ZSM-45. To the contrary, for example, the Rubin et al U.S. Pat. No. 4,086,186, the entire disclosure of which is expressly incorporated herein by reference, describes the formation of ZSM-34 with a choline chloride directing agent and reactants falling within the above-recited ranges for the use of such a directing agent. Accordingly, one must select reactants and crystallization conditions in a manner sufficient to lead to the formation of ZSM-45. This selection will be readily enabled by the guidance provided herein, especially with regard to the Examples and Comparative Examples recited hereinafter. In this regard, it is particularly noted that, when choline chloride is used as a directing agent, sufficiently high concentrations of potassium ions in the reaction mixture would appear to lead to the formation of ZSM-34 instead of ZSM-45. Accordingly, if, in a first attempt to make ZSM-45 using a choline chloride directing agent, one inadvertently made ZSM-34 instead, the second attempt might involve, e.g., lowering of the potassium ion concentration. Similarly, unsuccessful first attempts in the course of routine experimentation, which depart from the express reactant selections and conditions of the Examples recited hereinafter, could be followed by second attempts more closely corresponding with the express reactant selections and conditions of the Examples recited hereinafter.

It is further noted that the use of an appropriate seed crystal could theoretically change an otherwise non-ZSM-45 forming reactant mixture (e.g., a mixture capable of forming ZSM-34) to a mixture capable of forming ZSM-45.

When a 2-(hydroxyalkyl)trialkylammonium directing agent is used, the 2-(hydroxyalkyl)trialkylammonium compound may be the hydroxide or halide, e.g. chloride, iodide or bromide. When the compound is 2-(hydroxyethyl)trimethylammonium chloride, it is called choline chloride, a preferred source of organic cations (R) in the synthesis of zeolite ZSM-45.

The crystals prepared by the instant invention can be shaped into a wide variety of particle sizes. Generally speaking, the particles can be in the form of a powder, a granule, or a molded product, such as an extrudate having particle size sufficient to pass through a 2 mesh (Tyler) screen and be retained on a 400 mesh (Tyler) screen. In cases where the catalyst is molded, such as by extrusion, the crystals can be extruded before drying or partially dried and then extruded.

In the case of many catalysts, it is desired to incorporate the new zeolite ZSM-45 with another material resistant to the temperatures and other conditions employed in organic conversion processes. Such materials include active and inactive material and synthetic or naturally occurring zeolites as well as inorganic materials such as clays, silica and/or metal oxides, e.g. alumina. The latter may be either naturally occurring or in the form of gelatinous precipitates or gels including mixtures of silica and metal oxides. Use of a material in conjunction with the new ZSM-45 crystal, i.e. combined therewith, which is active, tends to improve the conversion and/or selectivity of the catalyst in certain organic conversion processes. Inactive materials suitably serve as diluents to control the amount of conversion in a given process so that products can be obtained economically and orderly without employing other means for controlling the rate of reaction. These materials may be incorporated into naturally occurring clays, e.g. bentonite and kaolin, to improve the crush strength of the catalyst under commercial operating conditions. Said materials, i.e. clays, oxides, etc., function as binders for the catalyst. It is desirable to provide a catalyst having good crush strength because in commercial use it is desirable to prevent the catalyst from breaking down into powder-like materials. These clay binders have been employed normally only for the purpose of improving the crush strength of the catalyst.

Naturally occurring clays which can be composited with the new crystal include the montmorillonite and kaolin families which include the subbentonites, and the kaolins commonly known as Dixie, McNamee, Georgia and Florida clays or others in which the main mineral constituent is halloysite, Kaolinite, dickite, nacrite, or anauxite. Such clays can be used in the raw state as originally mined or initially subjected to calcination, acid treatment or chemical modification. Binders useful for compositing with the present crystal also include inorganic oxides, notably alumina.

In addition to the foregoing materials, the zeolite ZSM-45 can be composited with a porous matrix material such as silica-alumina, silica-magnesia, silica-zirconia, silica-thoria, silica-beryllia, silica-titania as well as ternary compositions such as silica-alumina-thoria, silica-alumina-zirconia, silica-alumina-magnesia and silica-magnesia-zirconia. The relative proportions of finely divided crystalline material and inorganic oxide gel matrix vary widely, with the zeolite content ranging from about 1 to about 90 percent by weight and more usually, particularly when the composite is prepared in the form of beads, in the range of about 2 to about 80 weight percent of the composite.

The zeolite ZSM-45 of the present invention is useful as catalyst component for a variety of organic, e.g. hydrocarbon, compound conversion processes. Such conversion processes include, as non-limiting examples, cracking hydrocarbons with reaction conditions including a temperature of from about 300° C. to about 700° C., a pressure of from about 0.1 atmosphere (bar) to about 30 atmospheres and a weight hourly space velocity of from about 0.1 to about 20; dehydrogenating hydrocarbon compounds with reaction conditions including a temperature of from about 300° C. to about 700° C., a pressure of from about 0.1 atmosphere to about 10 atmospheres and a weight hourly space velocity of from about 0.1 to about 20; converting paraffins to aromatics with reaction conditions including a temperature of from about 100° C. to about 700° C., a pressure of from about 0.1 atmosphere to about 60 atmospheres, a weight hourly space velocity of from about 0.5 to about 400 and a hydrogen/hydrocarbon mole ratio of from about 0 to about 20; converting olefins to aromatics, e.g. benzene, toluene and xylenes, with reaction conditions including a temperature of from about 100° C. to about 700° C., a pressure of from about 0.1 atmosphere to about 60 atmospheres, a weight hourly space velocity of from about 0.5 to about 400 and a hydrogen/hydrocarbon mole ratio of from about 0 to about 20; converting alcohols, e.g. methanol, or ethers, e.g. dimethylether, or mixtures thereof to hydrocarbons including aromatics with reaction conditions including a temperature of from about 275° C. to about 600° C., a pressure of from about 0.5 atmosphere to about 50 atmospheres and a liquid hourly space velocity of from about 0.5 to about 100; isomerizing xylene feedstock components with reaction conditions including a temperature of from about 230° C. to about 510° C. a pressure of from about 3 atmospheres to about 35 atmospheres, a weight hourly space velocity of from about 0.1 to about 200 and a hydrogen/hydrocarbon mole ratio of from about 0 to about 100; disproportionating toluene with reaction conditions including a temperature of from about 200° C. to about 760° C., a pressure of from about atmospheric to about 60 atmospheres and a weight hourly space velocity of from about 0.08 to about 20; alkylating aromatic hydrocarbons, e.g. benzene and alkylbenzenes, in the presence of an alkylating agent, e.g. olefins, formaldehyde, alkyl halides and alcohols, with reaction conditions including a temperature of from about 340° C. to about 500° C., a pressure of from about atmospheric to about 200 atmospheres, a weight hourly space velocity of from about 2 to about 2000 and an aromatic hydrocarbon/alkylating agent mole ratio of from about 1/1 to about 20/1; and transalkylating aromatic hydrocarbons in the presence of polyalkylaromatic hydrocarbons with reaction conditions including a temperature of from about 340° C. to about 500° C., a pressure of from about atmospheric to about 200 atmospheres, a weight hourly space velocity of from about 10 to about 1000 and an aromatic hydrocarbon/polyalkylaromatic hydrocarbon mole ratio of from about 1/1 to about 16/1.

In order to more fully illustrate the nature of the invention and the manner of practicing same, the following examples are presented. In the examples, whenever adsorption data are set forth for comparison of sorptive capacities for water, cyclohexane and/or n-hexane, they were determined as follows:

A weighed sample of the calcined adsorbant was contacted with the desired pure adsorbate vapor in an adsorption chamber, evacuated to 1 mm and contacted with 12 mm Hg of water vapor or 20 mm Hg of n-hexane, or cyclohexane vapor, pressures less than the vapor-liquid equilibrium pressure of the respective adsorbate at room temperature. The pressure was kept constant (within about ±0.5 mm) by addition of adsorbate vapor controlled by a manostat during the adsorption period, which did not exceed about 8 hours. As adsorbate was adsorbed by the new crystal, the decrease in pressure caused the manostat to open a valve which admitted more adsorbate vapor to the chamber to restore the above control pressures. Sorption was complete when the pressure change was not sufficient to activate the manostat. The increase in weight was calculated as the adsorption capacity of the sample in g/100 g of calcined adsorbant.

When Alpha Value is examined, it is noted that the Alpha Value is an approximate indication of the catalytic cracking activity of the catalyst compared to a standard catalyst and it gives the relative rate constant (rate of normal hexane conversion per volume of catalyst per unit time). It is based on the activity of the highly active silica-alumina cracking catalyst taken as an Alpha Value of 1 (Rate Constant=0.016 sec$^{-1}$). The Alpha Test is described in U.S. Pat. No. 3,354,078 and in The Journal of Catalysis, Vol. IV, pp. 522-529 (August 1965), both incorporated herein by reference as to that description.

EXAMPLE 1

Three separate components were prepared to comprise ingredients as follows:
  A. 15.45 grams of $Al_2(SO_4)_3 \cdot 18\ H_2O$ 3.48 grams of $H_2SO_4$ 90.2 grams of $H_2O$
  B. 135.4 grams of Q-Brand sodium silicate (28.5 wt. percent $SiO_2$, 8.8 wt. percent $Na_2O$ and 62.7 wt. percent $H_2O$) 2.0 grams of 86.4 wt. percent KOH 11.0 grams of $H_2O$
  C. 38.0 grams of choline chloride Component C was added to component B and A was then added to the whole. The whole composition was then mixed and the mixture was transferred to a polypropylene jar. Crystallization occurred under static conditions at 99° C. over 197 days. The crystalline product was separated, washed and dried and identified by X-ray diffraction analysis to be about 90 percent new zeolite ZSM-45 plus about 10 percent unidentified impurities. The complete X-ray pattern data for this zeolite is presented in Table 2, hereinafter.

Chemical analysis of the zeolite product of this example proved it to have the following composition:

| Component | Wt. Percent |
|---|---|
| N | 2.07 |
| Na | 0.28 |
| K | 0.5 |
| $Al_2O_3$ | 7.40 |
| $SiO_2$ | 89.90 |
| Ash | 80.50 |
| $SiO_2/Al_2O_3$, molar | 20.7 |

Sorption capacities of the zeolite product of this example, calcined at 538° C., were:

| Adsorbate | Capacity, Wt. Percent |
|---|---|
| Cyclohexane, 20 Torr | 3.5 |
| n-Hexane, 20 Torr | 12.9 |
| Water, 12 Torr | 18.3 |

The surface area of the zeolite product of this example was measured to be 514 m$^2$/gram.

TABLE 2

| Degrees Two Theta | Interplanar D-Spacing (A) | Relative Intensity, I/Io |
|---|---|---|
| 7.72 | 11.45 | 6 |
| 8.60 | 10.28 | 13 |
| 10.91 | 8.11 | 50 |
| 11.45 | 7.73 | 3 |
| 11.65 | 7.60 | 6 |
| 13.41 | 6.60 | 36 |
| 15.60 | 5.68 | 6 |
| 16.00 | 5.54 | 9 |
| 17.38 | 5.10 | 81 |
| 17.84 | 4.97 | 12 |
| 20.98 | 4.23 | 51 |
| 22.08 | 4.03 | 100 |
| 23.44 | 3.80 | 45 |
| 25.05 | 3.55 | 13 |
| 25.53 | 3.49 | 5 |
| 25.94 | 3.43 | 5 |
| 27.12 | 3.29 | 20 |
| 28.53 | 3.13 | 47 |
| 29.38 | 3.04 | 6 |
| 31.70 | 2.823 | 8 |
| 32.45 | 2.759 | 40 |
| 34.57 | 2.595 | 10 |
| 35.25 | 2.546 | 2 |
| 35.46 | 2.513 | 2 |
| 38.08 | 2.363 | 2 |
| 38.41 | 2.344 | 1 |
| 39.80 | 2.265 | 3 |
| 40.50 | 2.227 | 1 |
| 41.25 | 2.189 | 3 |
| 42.23 | 2.140 | 3 |
| 43.00 | 2.103 | 8 |
| 44.52 | 2.035 | 2 |
| 45.10 | 2.010 | 4 |
| 46.89 | 1.938 | 1 |
| 47.32 | 1.921 | 1 |
| 48.02 | 1.895 | 6 |
| 48.02 | 1.863 | 6 |

TABLE 2-continued

| Degrees Two Theta | Interplanar D-Spacing (A) | Relative Intensity, I/Io |
|---|---|---|
| 49.40 | 1.845 | 3 |
| 50.10 | 1.821 | 7 |
| 51.61 | 1.771 | 12 |
| 52.42 | 1.745 | 1 |
| 53.00 | 1.728 | 2 |
| 53.50 | 1.713 | 1 |
| 54.10 | 1.695 | 1 |
| 55.00 | 1.670 | 1 |
| 55.58 | 1.653 | 3 |
| 56.02 | 1.642 | 8 |
| 56.82 | 1.620 | 3 |
| 57.5 | 1.607 | 2 |
| 59.15 | 1.562 | 5 |

COMPARATIVE EXAMPLE A

This Comparative Example demonstrates that ZSM-45 will not form unless sufficient ZSM-45 forming conditions are maintained. More particularly, this Comparative Example corresponds to Example 8 of the Rubin et al U.S. Pat. No. 4,086,186, wherein ZSM-34 was synthesized from mixtures containing aluminum sulfate and sodium silicate. Utilizing these reactants, a solution containing 15.98 grams of $Al_2(SO_4)_3 \cdot 18 H_2O$ in 100 grams of water was added to a solution of 135.4 grams of Q-Brand sodium silicate (8.8 percent $SiO_2$, 8.9 percent $Na_2O$ and 62 percent $H_2O$) and 40 grams of water to which 4.4 grams of KOH (86.4 percent) and 38 grams of choline chloride had been added. A gel formed having the following molar composition:

$$\frac{SiO_2}{Al_2O_3} = 27.2$$

$$\frac{R^+}{R^+ + Z^+} = 0.46$$

$$\frac{OH^-}{SiO_2} = 0.48$$

$$\frac{H_2O}{OH^-} = 39.6$$

$$\frac{K_2O}{Z_2O} = 0.22$$

This material was permitted to crystallize in a propylene container by exposure to a temperature of 210° F. for 98 days. The crystalline product obtained was filtered, water washed and dried at 230° F. and upon analysis was found to be ZSM-34 having the following molar composition:

0.93 $R_2O$:0.22 $K_2O$:0.08 $Na_2O$:$Al_2O_3$:13.7 $SiO_2$

The product obtained, after calcination at 1000° F. for 16 hours, had the following sorptive and surface area properties:

| Sorption | Wt. Percent |
|---|---|
| Cyclohexane | 3.1 |
| n-Hexane | 10.5 |
| Water | 19.0 |
| Surface Area $M^2/g$ | 528 |

Noted distinctions between Example 1 and Comparative Example A are (i) that the ratio of $K^+$ to $SiO_2$ in the reaction mixture of Comparative Example A is more than twice that of Example 1, and (ii) that the potassium to aluminum ratio in the reaction mixture of Comparative Example A exceeds one, whereas the potassium to aluminum ratio in the reaction mixture of Example 1 is less than one.

EXAMPLE 2

About 10 grams of the zeolite ZSM-45 product of Example 1 was calcined in air at 538° C. for 10 hours and then contacted with 10 cc/gram zeolite of 5 percent ammonium chloride solution at 29° C. five separate times. The resulting zeolite was then dried at about 110° C. and calcined at 538° C. for 10 hours in air. It was then submitted for evaluation in the Alpha Test. Its Alpha Value proved to be 14.

EXAMPLE 3

Three separate components were prepared to comprise ingredients as follows:

A. 15.45 grams of $Al_2(SO_4)_3 \cdot 18 H_2O$ 3.48 grams of $H_2SO_4$ 90.2 grams of $H_2O$ B. 135.4 grams of Q-Brand sodium silicate (28.5 wt. percent $SiO_2$, 8.8 wt. percent $Na_2O$ and 62.7 wt. percent $H_2O$) 2.0 grams of 86.4 wt. percent KOH 50.0 grams of $H_2O$ C. 38.0 grams of choline chloride Component C was added to component B and component A was then added to the whole. The whole composition was then mixed and the mixture was transferred to a polypropylene jar. Crystallization occurred under static conditions at 99% over 152 days. The crystalline product was separated, washed and dried and identified by X-ray diffraction analysis to be the new zeolite ZSM-45.

Chemical analysis of the zeolite product of this example proved it to have the following composition:

| Component | Wt. Percent |
|---|---|
| N | 2.25 |
| Na | 0.4 |
| K | 0.25 |
| $Al_2O_3$ | 7.0 |
| $SiO_2$ | 89.00 |
| Ash | 78.0 |

Sorption capacities of the zeolite product of this example, calcined at 538° C., were:

| Adsorbate | Capacity, Wt. Percent |
|---|---|
| Cyclohexane, 20 Torr | 3.8 |
| n-Hexane, 20 Torr | 11.3 |
| Water, 12 Torr | 16.2 |

The surface area of the zeolite product of this example was measured to be 467 $m^2$/gram.

EXAMPLE 4

About 10 grams of the zeolite ZSM-45 product of Example 3 was calcined in air at 538° C. for 10 hours and then contacted with 5 percent ammonium chloride solution, dried and calcined as in Example 2. It was then submitted for evaluation in the Alpha Test. Its Alpha Value proved to be 6.

EXAMPLE 5

Three separate components were prepared to comprise ingredients as follows:
- A. 28.7 grams of sodium aluminate 36.0 grams of NaOH 10.0 grams of 85 wt. percent KOH 450.0 grams of $H_2O$
- B. 650.0 grams of colloidal silica (30 wt. percent)
- C. 190.0 grams of choline chloride Component C was added to component A and component B was then added to the whole. The whole composition was then mixed and the mixture was transferred to a polypropylene jar. Crystallization occurred under static conditions at 121° C. over 21 days. The crystalline product was separated, washed and dried and identified by X-ray diffraction analysis to be about 85 percent new zeolite ZSM-45 plus about 15 percent unidentified impurities. The complete X-ray pattern data for this zeolite is presented in Table 3, hereinafter.

Chemical analysis of the zeolite product of this example proved it to have the following composition:

| Comonent | Wt. Percent |
| --- | --- |
| N | 2.34 |
| Na | 0.49 |
| K | 0.58 |
| $Al_2O_3$ | 6.90 |
| $SiO_2$ | 72.60 |
| Ash | 81.50 |

Sorption capacities of the zeolite product of this example, calcined at 538° C., were:

| Adsorbate | Capacity, Wt. Percent |
| --- | --- |
| Cyclohexane, 20 Torr | 5.0 |
| n-Hexane, 20 Torr | 11.0 |
| Water, 12 Torr | 14.5 |

The surface area of the zeolite product of this example was measured to be 484 m²/gram.

TABLE 3

| Degrees Two Theta | Interplanar D-Spacing (A) | Relative Intensity, I/Io |
| --- | --- | --- |
| 7.78 | 11.36 | 14 |
| 8.67 | 10.20 | 11 |
| 11.00 | 8.04 | 37 |
| 11.69 | 7.57 | 8 |
| 12.60 | 7.03 | 4 |
| 13.15 | 6.73 | 8 |
| 13.49 | 6.60 | 37 |
| 15.55 | 5.70 | 6 |
| 16.05 | 5.52 | 9 |
| 17.45 | 5.08 | 65 |
| 17.88 | 4.96 | 20 |
| 19.45 | 4.56 | 6 |
| 20.72 | 4.29 | 20 |
| 21.07 | 4.22 | 47 |
| 22.12 | 4.02 | 100 |
| 23.49 | 3.79 | 62 |
| 25.14 | 3.54 | 38 |
| 25.91 | 3.44 | 18 |
| 26.90 | 3.31 | 10 |
| 27.19 | 3.28 | 27 |
| 28.35 | 3.15 | 13 |
| 28.63 | 3.12 | 40 |
| 29.40 | 3.04 | 7 |
| 31.54 | 2.84 | 11 |
| 31.75 | 2.819 | 10 |
| 32.51 | 2.754 | 35 |
| 34.65 | 2.589 | 6 |
| 35.50 | 2.529 | 2 |
| 36.25 | 2.478 | 5 |
| 38.10 | 2.362 | 3 |
| 39.80 | 2.265 | 2 |
| 41.25 | 2.189 | 2 |
| 42.28 | 2.138 | 3 |
| 43.05 | 2.101 | 7 |
| 45.17 | 2.007 | 3 |
| 48.11 | 1.891 | 5 |
| 48.90 | 1.863 | 4 |
| 49.45 | 1.843 | 3 |
| 50.19 | 1.817 | 6 |
| 51.74 | 1.767 | 11 |
| 52.94 | 1.730 | 1 |
| 55.68 | 1.651 | 4 |
| 56.15 | 1.638 | 6 |
| 56.94 | 1.617 | 1 |
| 59.26 | 1.559 | 3 |

COMPARATIVE EXAMPLE B

This Comparative Example again demonstrates that ZSM-45 will not form unless sufficient ZSM-45 forming conditions are maintained. More particularly, this Comparative Example corresponds to Example 1 of the Rubin et al U.S. Pat. No. 4,086,186, wherein ZSM-34 was synthesized from a reaction mixture containing 4.43 grams of KOH (86.4 percent), 13 grams of NaOH (96 percent) and 5.74 grams of sodium aluminate (43.1 percent $Al_2O_3$, 33.1 percent $Na_2O$, 24 percent $H_2O$) dissolved in 90 grams of water. Choline chloride (38 grams) was added to the resulting solution, followed by the addition of 130 grams of colloidal silica (30 Wt. percent $SiO_2$ and 70 Wt. percent $H_2O$). A gel formed having the following molar composition:

$$\frac{SiO_2}{Al_2O_3} = 26.6$$

$$\frac{R^+}{R^+ + Z^+} = 0.38$$

$$\frac{OH^-}{SiO_2} = 0.68$$

$$\frac{H_2O}{OH^-} = 22.9$$

$$\frac{K_2O}{Z_2O} = 0.15$$

where R is choline $[(CH_3)_3NCH_2CH_2OH]$ and Z is Na+K. The resulting gel was mixed for 15 minutes and allowed to crystallize in a polypropylene container at 210° F. for 25 days. The crystalline product obtained was separated from the mother liquor by filtration, water washed and dried at 230° F. This product, upon analysis, was found to have the following composition molar ratio:

0.64 $R_2O$:0.47 $K_2O$:0.13 $Na_2O$:$Al_2O_3$:10.8 $SiO_2$ and the following X-ray diffraction pattern:

| Degrees Two Theta | Interplanar D-Spacing (A) | Relative Intensity, I/Io |
| --- | --- | --- |
| 7.65 | 11.56 | 100 |
| 9.60 | 9.21 | |

-continued

| Degrees Two Theta | Interplanar D-Spacing (A) | Relative Intensity, I/Io |
|---|---|---|
| 11.65 | 7.60 | 25 |
| 13.37 | 6.62 | 52 |
| 14.01 | 6.32 | 10 |
| 15.45 | 5.74 | 31 |
| 16.62 | 5.33 | 4 |
| 17.82 | 4.98 | 10 |
| 19.40 | 4.58 | 64 |
| 20.50 | 4.33 | 61 |
| 21.35 | 4.16 | 7 |
| 23.31 | 3.82 | 55 |
| 23.67 | 3.76 | 86 |
| 24.77 | 3.59 | 86 |
| 27.03 | 3.30 | 34 |
| 28.25 | 3.16 | 40 |
| 30.55 | 2.926 | 9 |
| 31.35 | 2.853 | 84 |
| 31.92 | 2.804 | 11 |
| 33.45 | 2.679 | 16 |
| 35.70 | 2.515 | 4 |
| 36.10 | 2.488 | 21 |
| 39.41 | 2.286 | 4 |
| 41.02 | 2.200 | 7 |
| 42.90 | 2.108 | 6 |
| 43.50 | 2.080 | 4 |
| 45.75 | 1.983 | 4 |
| 46.42 | 1.956 | 3 |
| 48.15 | 1.890 | 19 |
| 48.83 | 1.865 | 5 |
| 49.84 | 1.830 | 6 |

A portion of the product, calcined at 1000° F. for 16 hours, had the following sorption and surface area properties:

| Sorption | Wt. Percent |
|---|---|
| Cyclohexane | 4.4 |
| n-Hexane | 11.5 |
| Water | 22.2 |
| Surface Area $M^2/g$ | 523 |

Noted distinctions between Example 5 and Comparative Example B are (i) that the ratio of $K^+$ to $SiO_2$ in the reaction mixture of Comparative Example 8 is more than twice that of Example 5, and (ii) that the potassium to aluminum ratio in the reaction mixture of Comparative Example B exceeds one, whereas the potassium to aluminum ratio in the reaction mixture of Example 5 is less than one.

EXAMPLE 6

About 10 grams of the zeolite ZSM-45 product of Example 5 was calcined in air at 538° C. for 10 hours and then contacted with 5 percent ammonium chloride solution, dried and calcined as in Example 4. It was then submitted for evaluation in the Alpha Test. Its Alpha Value proved to be 27.

EXAMPLE 7

Three separate components were prepared to comprise ingredients as follows:
A. 23.2 grams of $Al_2(SO_4)_3 \cdot 18\ H_2O$ 5.2 grams of $H_2SO_4$ 135 grams of $H_2O$
B. 203.1 grams of Q-Brand sodium silicate (28.5 wt. percent $SiO_2$, 8.8 wt. percent $Na_2O$ and 62.7 wt. percent $H_2O$) 3.0 grams of 86.4 wt. percent KOH 75.0 grams of $H_2O$
C. 57.0 grams of choline chloride Component C was added to component B and A was then added to the whole. The whole composition was then mixed and the mixture was transferred to a polypropylene jar. Crystallization occurred under static conditions at 100° C. over 151 days. The crystalline product was separated, washed and dried and identified by X-ray diffraction analysis to be essentially 100 percent new zeolite ZSM-45. The complete X-ray pattern data for this zeolite is presented in Table 4, hereinafter.

Chemical analysis of the zeolite product of this example proved it to have the following composition:

| Component | Wt. Percent |
|---|---|
| N | 2.26 |
| Na | 0.37 |
| K | 0.79 |
| $Al_2O_3$ | 7.48 |
| $SiO_2$ | 85.8 |
| Ash | 82.8 |
| $SiO_2/Al_2O_3$, molar | 19.5 |

Sorption capacities of the zeolite product of this example, calcined at 538° C., were:

| Adsorbate | Capacity, Wt. Percent |
|---|---|
| Cyclohexane, 20 Torr | 3.4 |
| n-Hexane, 20 Torr | 12.9 |
| Water, 12 Torr | 21.1 |

The surface area of the zeolite product of this example was measured to be 471 $m^2$/gram.

TABLE 4

| Degrees Two Theta | Interplanar D-Spacing (A) | Relative Intensity, I/Io |
|---|---|---|
| 7.77 | 11.38 | 4 |
| 8.71 | 10.15 | 10 |
| 11.04 | 8.02 | 45 |
| 11.71 | 7.56 | 6 |
| 13.52 | 6.55 | 36 |
| 15.67 | 5.66 | 2 |
| 16.11 | 5.50 | 10 |
| 17.49 | 5.07 | 76 |
| 17.93 | 4.95 | 13 |
| 19.57 | 4.54 | 4 |
| 21.10 | 4.21 | 50 |
| 22.18 | 4.01 | 100 |
| 23.54 | 3.78 | 47 |
| 23.80 | 3.74 | 8 |
| 25.16 | 3.54 | 15 |
| 26.08 | 3.42 | 5 |
| 27.24 | 3.27 | 24 |
| 28.67 | 3.11 | 44 |
| 29.46 | 3.03 | 7 |
| 31.84 | 2.810 | 7 |
| 32.55 | 2.750 | 38 |
| 34.72 | 2.584 | 9 |
| 35.42 | 2.534 | 3 |
| 35.62 | 2.520 | 2 |
| 36.28 | 2.476 | 5 |
| 37.42 | 2.403 | 2 |
| 38.22 | 2.355 | 1 |
| 38.48 | 2.339 | 1 |
| 39.95 | 2.257 | 2 |
| 40.50 | 2.227 | 2 |
| 41.36 | 2.183 | 3 |
| 42.40 | 2.132 | 3 |
| 43.12 | 2.098 | 7 |
| 44.70 | 2.027 | 6 |
| 45.22 | 2.005 | 4 |
| 47.35 | 1.920 | 2 |
| 48.16 | 1.889 | 5 |
| 49.03 | 1.858 | 4 |
| 49.50 | 1.841 | 3 |
| 50.23 | 1.816 | 6 |
| 51.76 | 1.766 | 11 |
| 53.01 | 1.727 | 2 |

TABLE 4-continued

| Degrees Two Theta | Interplanar D-Spacing (A) | Relative Intensity, I/Io |
|---|---|---|
| 53.75 | 1.705 | 2 |
| 55.68 | 1.651 | 3 |
| 56.15 | 1.638 | 6 |
| 56.99 | 1.616 | 2 |
| 57.39 | 1.605 | 1 |
| 59.30 | 1.558 | 4 |

EXAMPLE 8

This Example demonstrates the preparation of ZSM-45 with a dimethyldiethylammonium directing agent. Sodium aluminate (29.8 percent $Na_2O$, 41.8 percent $Al_2O_3$), 0.5 g, was dissolved in 40.5 g of a 20 percent dimethyldiethylammonium hydroxide solution. A 50 percent sodium hydroxide solution, 0.5 g, and, finally, 8.3 g of Hi-Sil, a precipitated silica containing about 87 percent $SiO_2$, were added. The reaction mixture had the following composition:

| | |
|---|---|
| $SiO_2/Al_2O_3$ = | 60 |
| $(Na_2 + DMDEA_2O)/SiO_2$ = | 0.32 |
| $Na_2O/(Na_2O + DMDEA_2O)$ | 0.14 |
| $H_2O/(Na_2O + DMDEA_2O)$ | 48 |

The mixture was heated at 130° C. for 23 days. A sample of the product was dried at room temperature. This dried sample gave the X-ray diffraction pattern listed in Table 5.

| Degrees Two Theta | Interplanar D-Spacing (A) | Relative Intensity, I/Io |
|---|---|---|
| 8.69 | 10.18 | 12 |
| 11.01 | 8.04 | 40 |
| 11.73 | 7.54 | 8 |
| 13.46 | 6.58 | 38 |
| 16.05 | 5.52 | 6 |
| 17.44 | 5.08 | 69 |
| 17.81 | 4.98 | 21 |
| 21.18 | 4.20 | 47 |
| 22.09 | 4.02 | 100 |
| 23.43 | 3.80 | 28 |
| 25.26 | 3.53 | 3 |
| 27.13 | 3.29 | 21 |
| 28.77 | 3.10 | 33 |
| 29.31 | 3.05 | 12 |
| 32.04 | 2.793 | 11 |
| 32.41 | 2.762 | 36 |
| 34.78 | 2.579 | 8 |
| 35.00 | 2.564 | 5 |
| 36.14 | 2.485 | 2 |
| 38.42 | 2.343 | 3 |
| 39.80 | 2.265 | 3 |
| 41.13 | 2.194 | 2 |
| 42.37 | 2.133 | 3 |
| 43.02 | 2.102 | 5 |
| 44.92 | 2.018 | 3 |
| 45.15 | 2.008 | 4 |
| 48.50 | 1.877 | 4 |
| 49.26 | 1.850 | 5 |
| 50.07 | 1.822 | 5 |
| 51.85 | 1.763 | 8 |
| 55.91 | 1.644 | 7 |
| 59.05 | 1.564 | 3 |

The product was calcined for 4 hours at 500° C. The calcined product gave the X-ray diffraction pattern listed in Table 6. It still contained an amorphous impurity and had the following sorption capacities, g/100 g.

| | |
|---|---|
| Cyclohexane, 20 Torr | 3.6 |
| n-Hexane, 20 Torr | 14.8 |
| Water, 12 Torr | 16.7 |

The chemical composition of the sample dried at room temperature was, wt. percent:

| | |
|---|---|
| $SiO_2$ | 70.0 |
| $Al_2O_3$ | 4.4 |
| $Na_2O$ | 0.73 |
| N | 2.30 |
| Ash | 76.9 |
| $SiO_2/Al_2O_3$, molar | 27.0 |

TABLE 6

| Degrees Two Theta | Interplanar D-Spacing (A) | Relative Intensity, I/Io |
|---|---|---|
| 8.73 | 10.13 | 18 |
| 11.05 | 8.01 | 85 |
| 11.73 | 7.54 | 12 |
| 13.55 | 6.54 | 100 |
| 16.15 | 5.49 | 4 |
| 17.53 | 5.06 | 35 |
| 17.90 | 4.96 | 10 |
| 21.12 | 4.21 | 41 |
| 22.19 | 4.01 | 84 |
| 23.60 | 3.77 | 25 |
| 25.36 | 3.51 | 7 |
| 26.10 | 3.41 | 7 |
| 27.27 | 3.27 | 22 |
| 28.72 | 3.11 | 35 |
| 29.46 | 3.03 | 9 |
| 31.90 | 2.805 | 8 |
| 32.58 | 2.749 | 41 |
| 34.78 | 2.579 | 8 |
| 35.03 | 2.562 | 3 |
| 36.33 | 2.473 | 3 |
| 38.49 | 2.339 | 1 |
| 40.01 | 2.254 | 2 |
| 41.36 | 2.183 | 3 |
| 42.39 | 2.132 | 2 |
| 43.21 | 2.094 | 4 |
| 44.75 | 2.025 | 2 |
| 45.15 | 2.008 | 2 |
| 48.22 | 1.887 | 2 |
| 49.18 | 1.853 | 4 |
| 50.36 | 1.812 | 2 |
| 51.91 | 1.761 | 8 |
| 56.10 | 1.639 | 5 |
| 59.45 | 1.555 | 3 |

It is noted that when dimethyldiethylammonium directing agents are used, sufficiently higher $SiO_2:Al_2O_3$ ratios than employed in this Example may lead to the production of ZSM-12 in addition to or instead of ZSM-45. Similarly, when a DMDEA directing agent is used, sufficiently lower $SiO_2:Al_2O_3$ ratios than employed in this Example may lead to the production of zeolite Y in addition to or instead of ZSM-45.

EXAMPLE 9

One gram of sodium aluminate (29.8 percent $Na_2O$, 41.8 percent $Al_2O_3$) was dissolved in 37.25 g of 20 percent aqueous dimethyldiethylammonium hydroxide solution. Hi-Sil (87 percent $SiO_2$), 8.3 g, was added and dispersed. The reaction mixture had the following composition:

| | |
|---|---|
| $SiO_2/Al_2O_3$ = | 26.45 |
| $(Na_2 + DMDEA_2O)/SiO_2$ = | 0.30 |
| $Na_2O/(Na_2O + DMDEA_2O)$ | 0.133 |

| | |
|---|---|
| H₂O/(Na₂O + DMDEA₂O) | 49 |
| OH⁻/SiO₂ | 0.60 |

The mixture was heated at 160° C. in an autoclave at autogenous pressure.

A crystalline product was obtained after 21 days. It consisted mainly of ZSM-45, but contained a trace of an unidentified crystalline material. It had the following sorption capacities, g/100 g:

| | |
|---|---|
| Cyclohexane, 20 Torr | 2.1 |
| n-Hexane, 20 Torr | 13.5 |
| Water, 12 Torr | 19.8 |

The chemical composition was, wt. percent:

| | |
|---|---|
| SiO₂ (by difference) | 71.1 |
| Al₂O₃ | 6.4 |
| Na₂O | 0.38 |
| N | 2.21 |
| Ash | 77.9 |
| SiO₂/Al₂O₃, molar | 18.9 |

EXAMPLE 10

This Example demonstrates the preparation of ZSM-45 with a cobalticinium directing agent. A cobalticinium ion is represented by the following formula:

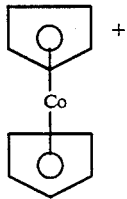

Crystallization was achieved utilizing a reaction mixture containing cobalticinium hexafluorophosphate, water, Q-brand sodium silicate, (27.8 percent SiO₂; 8.4 percent Na₂O; 63.8 percent H₂O), sodium hydroxide and Al₂(SO₄)₃ .16 H₂O. The mole ratio of H₂O:SiO₂ was 40. The crystallization was carried out at 160° C. while stirring at autogenous pressure. Reaction conditions and results are summarized in Table 7.

Analysis indicated that the product had a carbon to cobalt atomic ratio of 10.5, and a sodium oxide to silica to cobalt molar ratio per mole of Al₂O₃, wherein cobalt is expressed in terms of moles of CoO, of 1.13:13.6:0.90.

TABLE 7

| Crystallization with Cobalticinium Ion | | | | | |
|---|---|---|---|---|---|
| Mixture Composition (Mole Ratios) | | | | | |
| SiO₂/Al₂O₃ | OH⁻/SiO₂ | Na⁺/SiO₂ | Co/SiO₂ | Days | Product |
| 15 | 0.40 | 0.76 | 0.10 | 6 | ZSM-45 |

EXAMPLE 11

The procedure of Example 10 was followed except that the Na+:SiO₂ ratio was decreased from 0.76 to 0.53. Analysis indicated that the product had a carbon to cobalt atomic ratio of 10.8, and a sodium oxide to silica to cobalt molar ratio per mole of Al₂O₃, wherein cobalt is expressed in terms of moles of CoO, of 1.08:13.3:1.1. Reaction conditions and results are summarized in Table 8.

TABLE 8

| Crystallization with Cobalticinium Ion | | | | | |
|---|---|---|---|---|---|
| Mixture Composition (Mole Ratios) | | | | | |
| SiO₂/Al₂O₃ | OH⁻/SiO₂ | Na⁺/SiO₂ | Co/SiO₂ | Days | Product |
| 15 | 0.40 | 0.53 | 0.10 | 6 | ZSM-45 |

EXAMPLE 12

The procedure of Example 10 was followed except that the Na+:SiO₂ ratio was increased from 0.76 to 0.93 and crystallization time was decreased from 6 days to 2 days. A partial crystallization of ZSM-45 was achieved. Reaction conditions and results are summarized in Table 9.

TABLE 9

| Crystallization with Cobalticinium Ion | | | | | |
|---|---|---|---|---|---|
| Mixture Composition (Mole Ratios) | | | | | |
| SiO₂/Al₂O₃ | OH⁻/SiO₂ | Na⁺/SiO₂ | Co/SiO₂ | Days | Product |
| 15 | 0.40 | 0.93 | 0.10 | 2 | Part. crystn. ZSM-45 |

COMPARATIVE EXAMPLE C

This Comparative Example again demonstrates that ZSM-45 will not form unless sufficient ZSM-45 forming conditions are maintained. More particularly, the procedure of Example 10 was followed except that the SiO₂:Al₂O₃ ratio was increased from 15 to 30, the Na+:SiO₂ ratio was increased from 0.76 to 0.91 and the crystallization time was decreased from 6 days to 2 days. It is noted that the procedure of this Comparative Example corresponds very closely to the procedure of Example 12 except that the SiO₂:Al₂O₃ ratio is increased from 15 to 30 and the Na+:SiO₂ ratio was decreased from 0.93 to 0.91. Reaction conditions and results are summarized in Table 10.

TABLE 10

| Crystallization with Cobalticinium Ion | | | | | |
|---|---|---|---|---|---|
| Mixture Composition (Mole Ratios) | | | | | |
| SiO₂/Al₂O₃ | OH⁻/SiO₂ | Na⁺/SiO₂ | Co/SiO₂ | Days | Product |
| 30 | 0.40 | 0.91 | 0.10 | 2 | not ZSM-45 |

As indicated by Table 10, the product of the crystallization of this Comparative Example is not ZSM-45. The formation of a zeolite other than ZSM-45 according to this Comparative Example is believed to be primarily attributable to the use of the relatively high ratio of SiO₂:Al₂O₃.

COMPARATIVE EXAMPLE D

This Comparative Example further demonstrates that ZSM-45 will not form unless sufficient ZSM-45 forming conditions are maintained. More particularly, crystallization was again carried out at 160° C. while stirring at autogenous pressure but the reaction mixture contained potassium silicate manufactured by the Philadelphia Quartz Company under their tradename "KASIL-88", $Al_2(SO_4)_3.16\ H_2O$, water and the cobalticinium hexafluorophosphate. The mole ratio of $H_2O:SiO_2$ was 40. The zeolite of Comparative Example C formed instead of ZSM-45. Reaction conditions and results are summarized in Table 11.

TABLE 11

| Crystallization with Cobalticinium Ion | | | | | |
|---|---|---|---|---|---|
| Mixture Composition (Mole Ratios) | | | | | |
| $SiO_2$ / $Al_2O_3$ | $OH^-$ / $SiO_2$ | $K^+$ / $SiO_2$ | Co / $SiO_2$ | Days | Product |
| 60 | 0.40 | 0.61 | 0.10 | 3 | not ZSM 45 |

EXAMPLE 13

The procedure of Examples 10–12 was followed with the exception that silica sol (30 percent $SiO_2$) and sodium aluminate were substitute for the q-brand sodium silicate and the aluminum sulfate. Analysis indicated that the product had a carbon to cobalt atomic ratio of 10.6, and a silica to cobalt molar ratio per mole of $Al_2O_3$, wherein cobalt is expressed in terms of moles of CoO, of 8.7:0.55. Reaction conditions and results are summarized in Table 12.

TABLE 12

| Crystallization with Cobalticinium Ion | | | | | |
|---|---|---|---|---|---|
| Mixture Composition (Mole Ratios) | | | | | |
| $SiO_2$ / $Al_2O_3$ | $OH^-$ / $SiO_2$ | $Na^+$ / $SiO_2$ | Co / $SiO_2$ | Days | Product |
| 10 | 0.55 | 0.67 | 0.10 | 6 | ZSM-45 |

EXAMPLE 14

The procedure of Example 13 was followed except that the $OH^-:SiO_2$ ratio was decreased from 0.55 to 0.45 and the $Na^+:SiO_2$ ratio was decreased from 0.67 to 0.57. The product was ZSM-45 plus an unidentified contaminant. Reaction conditions and results are summarized in Table 13.

Analysis indicated that the product had a carbon to cobalt atomic ratio of 10.7, and a sodium oxide to silica to cobalt molar ratio per mole of $Al_2O_3$, wherein cobalt is expressed in terms of moles of CoO, of 0.70:8.6:0.61.

TABLE 13

| Crystallization with Cobalticinium Ion | | | | | |
|---|---|---|---|---|---|
| Mixture Composition (Mole Ratios) | | | | | |
| $SiO_2$ / $Al_2O_3$ | $OH^-$ / $SiO_2$ | $Na^+$ / $SiO_2$ | Co / $SiO_2$ | Days | Product |
| 10 | 0.45 | 0.57 | 0.10 | 6 | ZSM-45 + Contaminant |

The results of all the crystallizations with a cobalticinium directing agent as reported herein in Tables 7–13 are summarized in Table 14.

TABLE 14

| Crystallization with Cobalticinium Ion | | | | | | | |
|---|---|---|---|---|---|---|---|
| | Mixture Composition (Mole Ratios)[a] | | | | | | |
| Table | $SiO_2$/$Al_2O_3$ | $OH^-$/$SiO_2$ | $Na^+$/$SiO_2$ | $K^+$/$SiO_2$ | Co/$SiO_2$ | Days | Product |
| 7[b] | 15 | 0.40 | 0.76 | — | 0.10 | 6 | ZSM-45 |
| 8[b] | 15 | 0.40 | 0.53 | — | 0.10 | 6 | ZSM-45 |
| 9[b] | 15 | 0.40 | 0.93 | — | 0.10 | 2 | Part. crystn. ZSM-45 |
| 10[b] | 30 | 0.40 | 0.91 | — | 0.10 | 2 | not ZSM-45 |
| 11[c] | 60 | 0.40 | — | 0.61 | 0.10 | 3 | not ZSM-45 |
| 12[d] | 10 | 0.55 | 0.67 | — | 0.10 | 6 | ZSM-45 |
| 13[d] | 10 | 0.45 | 0.57 | — | 0.10 | 6 | ZSM-45 + Contaminant |

[a] $H_2O/SiO_2 = 40$
[b] Silica sol (30 percent $SiO_2$); Na $AlO_2$; NaOH
[c] Kasil-88 potassium silicate; $Al_2(SO_4)_3.16\ H_2O$
[d] Q-brand sodium silicate; $Al_2(SO_4)_3.16H_2O$; NaOH

What is claimed is:

1. The as-synthesized form of a zeolite, designated ZSM-45, having a composition, on an anhydrous basis and in terms of moles of oxides per mole of alumina, expressed by the formula:

(0.8–1.8)$R_2$: (0.0–0.3)$Na_2O$: (0.0–0.5)$K_2O$: $Al_2O_3$: $xSiO_2$ wherein R is 2-(hydroxyalkyl)trimethylammonium and x is at least 8, the calcined form of said zeolite having the X-ray diffraction pattern of Table 1, and the calcined form of said zeolite being capable of sorbing at least 2 percent by weight of cyclohexane.

* * * * *